(12) United States Patent
Choi

(10) Patent No.: US 9,360,325 B2
(45) Date of Patent: Jun. 7, 2016

(54) APPARATUS AND METHOD FOR GENERATING SKETCH MAP INFORMATION IN PORTABLE TERMINAL

(71) Applicant: Samsung Electronics Co., Ltd, Gyeonggi-do (KR)

(72) Inventor: Woo-Jun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/469,333

(22) Filed: Aug. 26, 2014

(65) Prior Publication Data

US 2014/0365112 A1 Dec. 11, 2014

Related U.S. Application Data

(63) Continuation of application No. 14/066,453, filed on Oct. 29, 2013, now Pat. No. 8,818,724, which is a continuation of application No. 12/928,125, filed on Dec. 3, 2010, now Pat. No. 8,571,788.

(30) Foreign Application Priority Data

Dec. 4, 2009 (KR) ........................ 10-2009-0119670

(51) Int. Cl.
*G01C 21/00* (2006.01)
*G01C 21/20* (2006.01)
*G01C 21/36* (2006.01)

(52) U.S. Cl.
CPC ................ *G01C 21/20* (2013.01); *G01C 21/00* (2013.01); *G01C 21/3626* (2013.01)

(58) Field of Classification Search
CPC .... G01C 21/00; G01C 21/20; G01C 21/3626; G01C 21/3632
See application file for complete search history.

(56) References Cited

U.S. PATENT DOCUMENTS

| | | | |
|---|---|---|---|
| 2001/0050631 | A1 | 12/2001 | Takenaga |
| 2003/0125872 | A1* | 7/2003 | Kauvo et al. .................. 701/209 |
| 2004/0260465 | A1 | 12/2004 | Tu |
| 2005/0222756 | A1* | 10/2005 | Davis et al. .................... 701/205 |
| 2006/0209802 | A1 | 9/2006 | Kang et al. |
| 2009/0005018 | A1 | 1/2009 | Forstall et al. |
| 2009/0093261 | A1 | 4/2009 | Ziskind et al. |
| 2009/0143079 | A1 | 6/2009 | Klassen et al. |
| 2009/0271111 | A1 | 10/2009 | Takanashi et al. |
| 2010/0029302 | A1 | 2/2010 | Lee et al. |
| 2010/0125409 | A1 | 5/2010 | Prehofer |
| 2010/0178948 | A1 | 7/2010 | Hong et al. |

FOREIGN PATENT DOCUMENTS

KR 20080063547 A 7/2008

OTHER PUBLICATIONS

Non-Final Office Action dated Dec. 24, 2013 in connection with U.S. Appl. No. 14/066,453; 7 pages.
Korean Notice of Preliminary Rejection, dated Aug. 10, 2015, in connection with Korean Patent Application No. 10-2009-0119670, 9 pages.
Notice of Patent Grant dated Jan. 20, 2016 in connection with European Patent Application No. KR10-2009-0119670; 7 pages.

* cited by examiner

*Primary Examiner* — Michael J Zanelli

(57) ABSTRACT

Provided is an apparatus and method for generating a sketch map in a portable terminal. The apparatus includes a sketch map generating unit. The sketch map generating unit collects information about route points of the portable terminal by using location information, generates a sketch map message including the route information, and shares the generated sketch map message with another user.

14 Claims, 8 Drawing Sheets

APPARATUS AND METHOD FOR GENERATING SKETCH MAP INFORMATION IN PORTABLE TERMINAL

CROSS-REFERENCE TO RELATED APPLICATION(S) AND CLAIM OF PRIORITY

This application is a continuation of U.S. patent application Ser. No. 14/066,453 filed Oct. 29, 2013 entitled "APPARATUS AND METHOD FOR GENERATING SKETCH MAP INFORMATION IN PORTABLE TERMINAL" which claims priority to U.S. patent application Ser. No. 12/928,125 filed Dec. 3, 2010 which claims priority under 35 U.S.C. §119 to an application filed in the Korean Intellectual Property Office on Dec. 4, 2009 and assigned Serial No. 10-2009-0119670, the entire disclosures thereof are hereby incorporated by reference.

TECHNICAL FIELD OF THE INVENTION

The present invention relates generally to an apparatus and method for providing route information in a portable terminal and, in particular, to an apparatus and method for generating a sketch map message including route point information of a portable terminal and sharing the generated sketch map message with a user of another portable terminal.

BACKGROUND OF THE INVENTION

Recently, portable terminals have become necessary articles used by people of all ages. and service providers and terminal manufacturers are competing in developing products (or services) to differentiate from other enterprises.

For example, portable terminals have evolved into multimedia devices to provide various functions and services such as phone book functions, game functions, Short Message Service (SMS), Electronic (e)-mail services, morning call functions, Motion Picture Expert Group Audio Layer-3 (MP3) functions, scheduling functions, digital camera functions, wireless Internet services, and so forth.

Also, the portable terminals provide a navigation function for receiving satellite signals and connecting to traffic information centers through mobile communication networks to provide traffic information or route information to users.

The navigation function notifies a moving route to a user of the portable terminal, but cannot provide route point information of the user of the portable terminal.

Also, because the navigation function cannot share the route information with a user of another portable terminal, a user of a portable terminal without a navigation function cannot detect the moving route.

That is, a user of a portable terminal without a navigation function may have a schedule with another user but may not know a route to the destination. If the route information can be shared with the user, the user can easily visit the destination by using the shared route information. However, if the sharing of the route information is impossible, the user is inconvenienced by having to continuously communicate with the other user to visit the destination.

What is therefore required is an apparatus and method for a portable terminal that can overcome the above problems.

SUMMARY OF THE INVENTION

To address the above-discussed deficiencies of the prior art, one aspect of the present invention is to substantially solve at least the above problems and/or disadvantages and to provide at least the advantages below. Accordingly, an aspect of the present invention is to provide an apparatus and method for generating a sketch map message, including route point information of a user, in a portable terminal.

Another aspect of the present invention is to provide an apparatus and method for sharing a sketch map message, including route point information, with a user of another portable terminal.

In accordance with an aspect of the present invention, an apparatus for generating a sketch map in a portable terminal includes a sketch map generating unit that collects information about route points of the portable terminal by using location information, generates a sketch map message including the route information, and shares the generated sketch map message with another user.

In accordance with another aspect of the present invention, a method for generating a sketch map in a portable terminal is provided. Information about route points of the portable terminal is collected by using location information. A sketch map message including the route information is generated. And the generated sketch map message is shared with another user.

In accordance with another aspect of the present invention, an apparatus for generating a sketch map in a portable terminal is provided. The apparatus includes a satellite signal receiving module configured to receive a satellite signal. A sketch map generating unit detects/stores the current location of the portable terminal by using the satellite signal, detects information about a route to a destination, and generates a sketch map message including the route information. And a control unit is configured to share the generated sketch map message with another user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6F, discussed below, and the various embodiments used to describe the principles of the present disclosure in this patent document are by way of illustration only and should not be construed in any way to limit the scope of the disclosure.

The present invention provides an apparatus and method for generating a sketch map message including route point information of a portable terminal and sharing the generated sketch map message with a user of another portable terminal.

Figure 1:
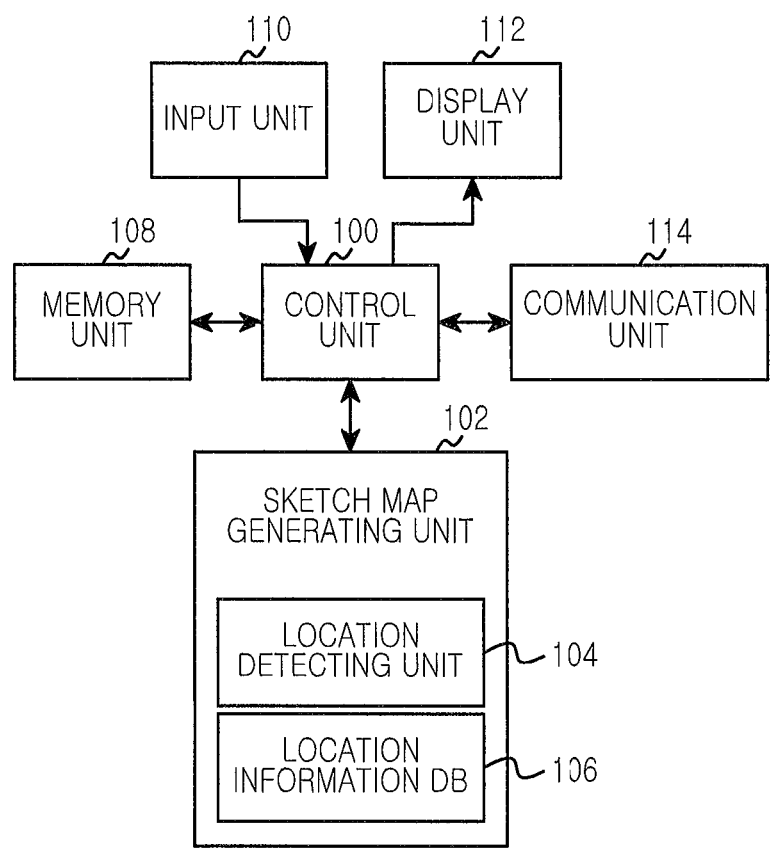
FIG. 1 illustrates a portable terminal capable of generating a sketch map message according to an embodiment of the present invention.

FIG. 1 illustrates a portable terminal capable of generating a sketch map message according to an embodiment of the present invention.

As shown in FIG. 1, the portable terminal may include a control unit 100, a sketch map generating unit 102, a memory unit 108, an input unit 110, a display unit 112, and a communication unit 114. The sketch map generating unit 102 may include a location detecting unit 104 and a location information database (DB) 106, or may be configured to perform a function of the location detecting unit 104 and a function of the location information database (DB) 106. The portable terminal may include additional units. Similarly, the functionality of two or more of the above units may be integrated into a single component.

The control unit 100 of the portable terminal controls an overall operation of the portable terminal. For example, the control unit 100 processes and controls voice communication and data communication. In addition to the general functions, according to the present invention, the control unit 100 detects the location of the portable terminal and collects route information of the portable terminal.

The control unit 100 generates a sketch map message including the collected route information and transmits the generated sketch map message to another portable terminal, thereby enabling the sharing of the sketch map message. That is, the control unit 100 enables a user of the other portable to easily visit the destination by using the received sketch map message.

Herein, the sketch map message is generated to enable the sharing of the route information of the portable terminal with a user of another portable terminal. In conjunction with a schedule function, the sketch map message includes information about a route to a destination point.

When receiving a sketch map message from another portable terminal, the control unit 100 displays the route information in the received sketch map message and displays the moving location of the portable terminal as the moving location on the sketch map, thereby enabling the movement to the route points included in the sketch map message.

Under the control of the control unit 100, the sketch map generating unit 102 detects a moving route of the portable terminal and generates a sketch map message including the route information.

The sketch map generating unit 102 detects the location of the portable terminal through the location detecting unit 104 and stores the location information in the location information DB 106. If there is more than a predetermined distance difference between the previous location and the current location, the sketch map generating unit 102 determines that the portable terminal has moved. This is to reduce the amount of location information of the portable terminal.

Also, when detecting that the portable terminal is located in the same region a predetermined number of times or duration, the sketch map generating unit 102 determines that the portable terminal has moved to the destination, and ends the location information detecting process.

Under the control of the sketch map generating unit 102, the location detecting unit 104 detects the location of the portable terminal. The location information DB 106 stores the location information of the portable terminal detected by the location detecting unit 104.

Also, the location information DB 106 stores information about a region in a sketch map of which is to be generated by the portable terminal.

In order to secure a data storage space, the information about a region in a sketch map of which is to be generated includes information about specific places (e.g., subway stations, bus stations, and railroad stations), instead of information about many places in the navigation function. The specific region information may be within a radius of the corresponding region (e.g., a radius of 2 km to 3 km around the Sinchon station).

The memory unit 108 includes a ROM, a RAM a flash ROM and such. The ROM stores a variety of reference data and microcodes of a program for the process and control of the control unit 100 and the sketch map generating unit 102.

The RAM is a working memory of the control unit 100, which stores temporary data that are generated during the execution of various programs. The flash ROM stores a variety of refreshable data such as a phone book, an outgoing message, an incoming message, and a user touch input point.

The input unit 110 includes numeric keys of digits '0'-'9' and a plurality of function keys, such as a Menu key, a Cancel (delete) key, a Confirmation key, a Talk key, an End key, an Internet connection key, Navigation keys (or Direction keys), character input keys, and such. The input unit 110 provides the control unit 100 with key input data that corresponds to a key pressed by a user.

The display unit 112 displays numerals and characters, moving pictures, still pictures and status information generated during an operation of the portable terminal. The display unit 112 may be a color liquid crystal display (LCD), an Active Mode Organic Light Emitting Diode (AMOLED), and such. If the display unit 112 has a touch input device and is applied to a touch input type portable terminal, it may also be used as an input device.

The communication unit 114 transmits/receives Radio Frequency (RF) signals inputted/outputted through an antenna (not illustrated). For example, in a transmitting (TX) mode, the communication unit 114 channel-encodes, spreads, and RF-processes TX data prior to transmission. In a receiving (RX) mode, the communication unit 114 converts a received RF signal into a baseband signal and despreads and channel-decodes the baseband signal to restore the data.

The control unit 100 of the portable terminal may also be configured to perform the functions of the sketch map generating unit 102. Although separate components are illustrated for respective functions in FIG. 1, the control unit 100 may also be configured to perform all or some of the functions on behalf of such separate components.

Figure 2:
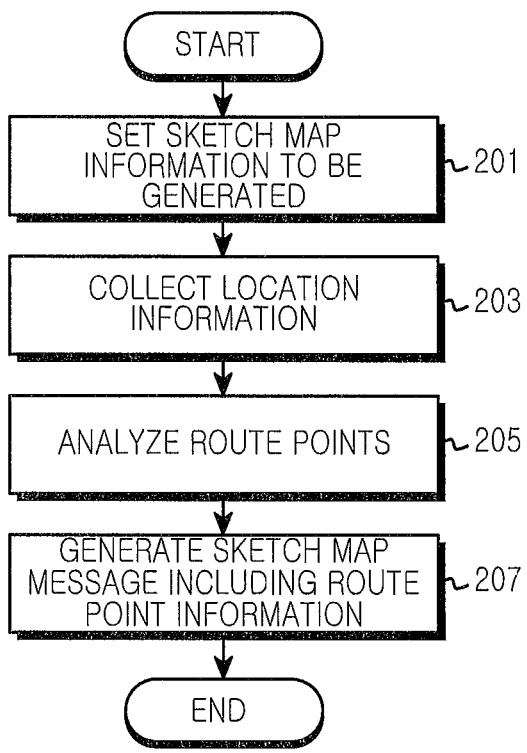
FIG. 2 illustrates a process for generating a sketch map message, which represents a moving route of a user, in a portable terminal according to an embodiment of the present invention.

FIG. 2 illustrates a process for generating a sketch map message, which represents a moving route of a user, in a portable terminal according to an embodiment of the present invention.

As shown in FIG. 2, in step 201, the portable terminal sets sketch map information to be generated. The sketch map information to be generated includes information about a region for which a sketch map is to be generated by a user of the portable terminal. In conjunction with a schedule function, the sketch map information may include schedule setting information (e.g., schedule time and schedule contents).

In step 203, the portable terminal collects location information.

The location information is information about a route location of the user of the portable terminal, which corresponds to the route information included in the sketch map message. The location information collecting process will be described below in detail with reference to FIG. 3.

In step 205, the portable terminal analyzes the route of the user of the portable terminal. If all of the location information collected in step 203 is set to route information, a plurality of route points are displayed on the display unit of the portable terminal. In an embodiment, the present invention selects only a specific route place among the collected location information in order to prevent an increase in the complexity of a sketch map. The route information analysis may be performed in descending order of the distance between route points. This will be described below in detail with reference to FIG. 4.

In step 207, the portable terminal generates a sketch map message including the route information analyzed in step 205. The sketch map message is generated to share the route points of the portable terminal with a user of another portable terminal. The sketch map message may be a short message type or a multimedia message type. The sketch map message may be divided into a plurality of messages according to the capacity.

Figure 3:
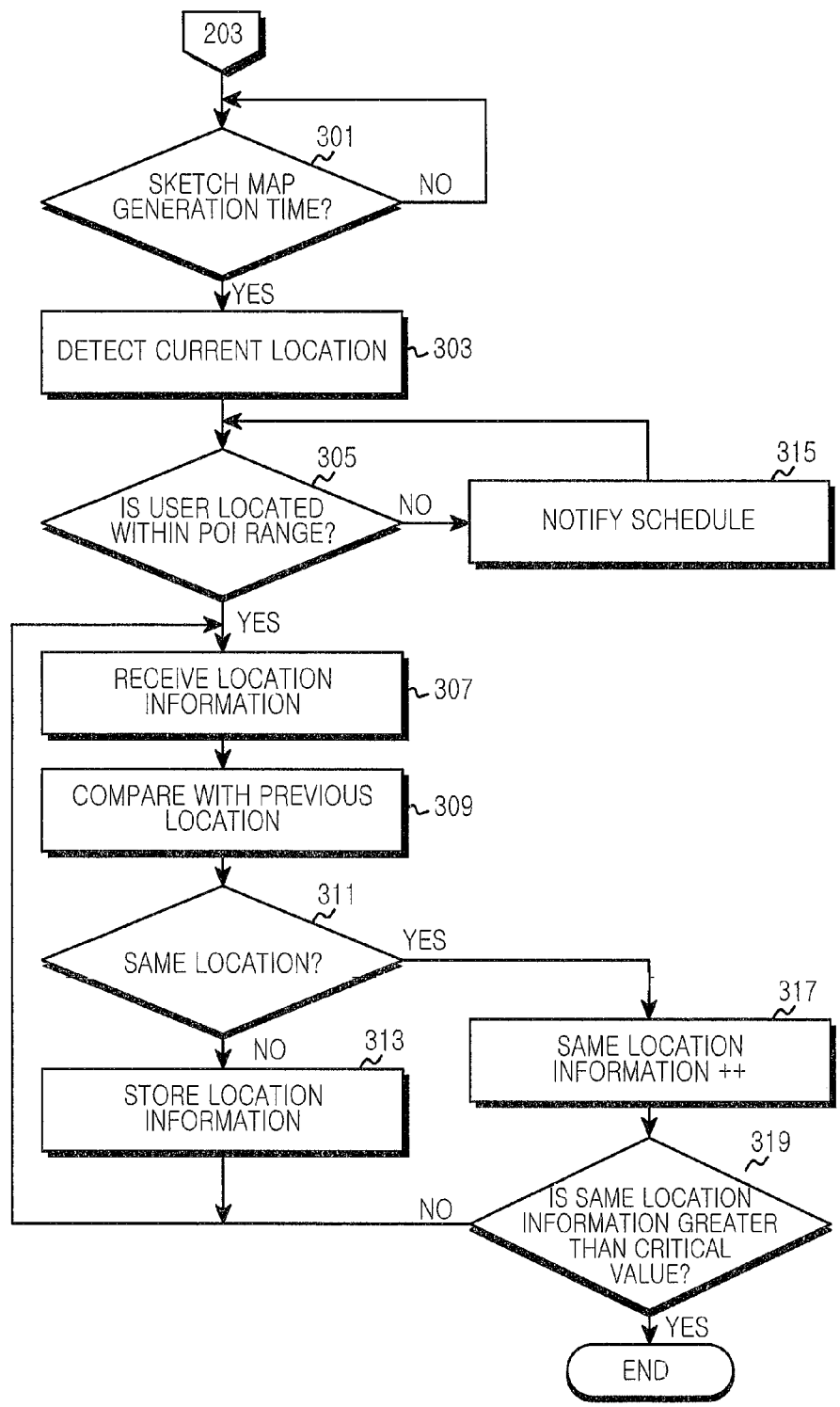
FIG. 3 illustrates a process for collecting user location information for generating a sketch map message in a portable terminal according to an embodiment of the present invention.

FIG. 3 illustrates a process for collecting user location information for generating a sketch map message in a portable terminal according to an embodiment of the present invention.

As shown in FIG. 3, the portable terminal determines whether it is the time to generate a sketch map.

The sketch map generation time refers to the time to begin detecting route points to generate a sketch map for the route points of a user of the portable terminal. In conjunction with a schedule function, the sketch map generation time may be the schedule setting time set by the user.

If it is not the sketch map generation time (in step 301), the portable terminal again performs an operation of step 301, or displays scheduler information (e.g., time and place) together with an alarm and displays the direction and the distance between the current location and the destination location.

If it is the sketch map generation time (in step 301), the portable terminal proceeds to step 303. In step 303, the portable terminal detects its current location. The portable terminal may receive a satellite signal to detect its location for detecting the route points of the user.

In step 305, the portable terminal determines whether it is located within range of a POI (Position Of Interest). The POI range is information within a region for which a sketch map is to be generated by the user of the portable terminal. The POI range may be detected by comparing the sketch map information set in step 201 of FIG. 2 with the location of the portable terminal. For example, it is determined in step 305 whether the portable terminal is located in a predetermined range of a region set by the sketch map information.

If it is not located within the POI range (in step 305), the portable terminal proceeds to step 315. In step 315, the portable terminal notifies the existence of a schedule to the user. That is, although the portable terminal generating the sketch map message is to generate a sketch map for the corresponding schedule in conjunction with the schedule function, because the user does not perform the corresponding schedule, the portable terminal notifies the existence of the schedule to the user. If the portable terminal is not in conjunction with the schedule function, the portable terminal again performs step 305 instead of step 315.

In contrast, if it is located within the POI range (in step 305), the portable terminal proceeds to step 307. In step 307, the portable terminal receives location information to detect its current location. In step 309, the portable terminal compares its previous location with its current location.

If there is more than a predetermined difference in distance between the previous location and the current location, the portable terminal determines that it has moved. In contrast, if there is less than a predetermined distance difference between the previous location and the current location, the portable terminal determines that it is located in the same region. This is to reduce the amount of location information stored in the portable terminal.

In step 311, the portable terminal determines the results of the comparison in step 309.

If the portable terminal determines that it is not located in the same region (in step 311), the portable terminal proceeds to step 313. In step 313, the portable terminal stores its current location and returns to step 307.

That is, the portable terminal detects/stores its location until reaching the final destination (e.g., the schedule place) of the sketch map.

In contrast, if the portable terminal determines that it is located in the same region (in step 311), the portable terminal proceeds to step 317. In step 317, the portable terminal increases the counter of the same location information.

The same location information may be used to determine whether the portable terminal has reached the final destination of the sketch map. If the portable terminal detects the same location information of a predetermined value or more, the portable terminal may determine that it has not moved to the final destination.

Because there may be a situation in which the portable terminal is located in an indoor place of the final destination and fails to receive location information, the portable terminal may increase the same location information at the stop time point of the reception of the satellite signal.

In step 319, the portable terminal determines whether the increased same location information is greater than a critical value.

If the increased same location information is smaller than the critical value (in step 319), the portable terminal determines that it has not reached the final destination, and returns to step 307.

Alternatively, if the increased same location information is greater than the critical value (in step 319), the portable terminal determines that it has reached the final destination, and ends the algorithm of the present invention.

Figure 4:
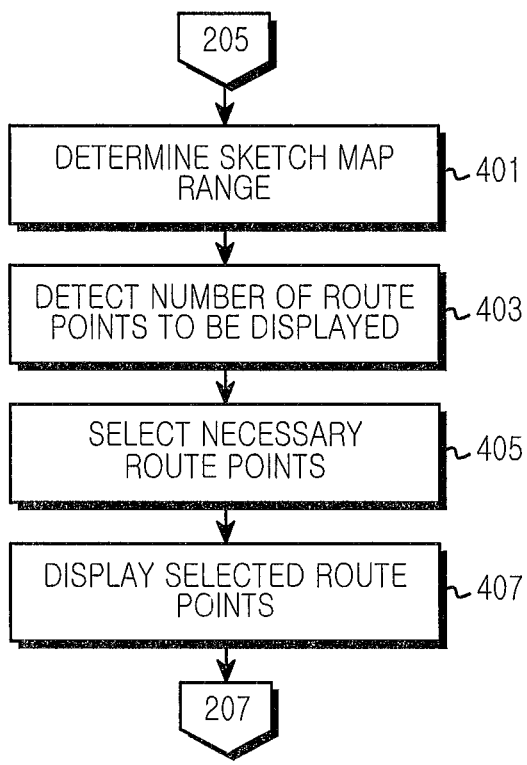
FIG. 4 illustrates a process for selecting a route of a user in a portable terminal according to an embodiment of the present invention.

FIG. 4 illustrates a process for selecting a route of a user in a portable terminal according to an embodiment of the present invention.

As shown in FIG. 4, it is assumed that the portable terminal has collected/stored location information in step 203 of FIG. 2.

In step 401, the portable terminal, which has collected location information, determines the range of a sketch map to be generated, in order to select a route point. The range of the sketch map may be a selection range of the route included in the sketch map to be generated, which corresponds to the distance of the route between a vertical distance and a horizontal distance.

For example, the portable terminal compares the distances between points of the same horizontal direction (West and East) (from the start point) to detect the point with the largest distance for each direction (West/East). Likewise, the portable terminal detects the point with the largest distance for each of the vertical directions (North and South). If the largest distance for North/South/East/West is 150 m/200 m/300 m/20 m, the range of the generated sketch map may be horizontally 320 m and vertically 350 m.

In step 403, the portable terminal determines the number of route points to be displayed on the sketch map. If all of the collected route points are to be displayed on the sketch map, the portable terminal may select the route point of a specific region in order to prevent the complexity of the sketch map due to the displayed route points.

In step 405, the portable terminal selects the determined number of route points. In step 407, the portable terminal displays the selected route points. The portable terminal may select/display the route points in descending order of the distance between route points or distance from the destination.

Thereafter, the portable terminal proceeds to step 207 of FIG. 2 to perform an operation of generating a sketch map message including route points.

Figure 5A:
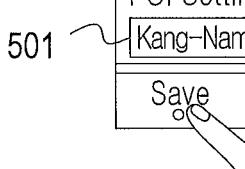
FIG. 5A illustrates a display screen that displays setting sketch map information to be generated in a portable terminal according to an embodiment of the present invention.
Figure 5B:
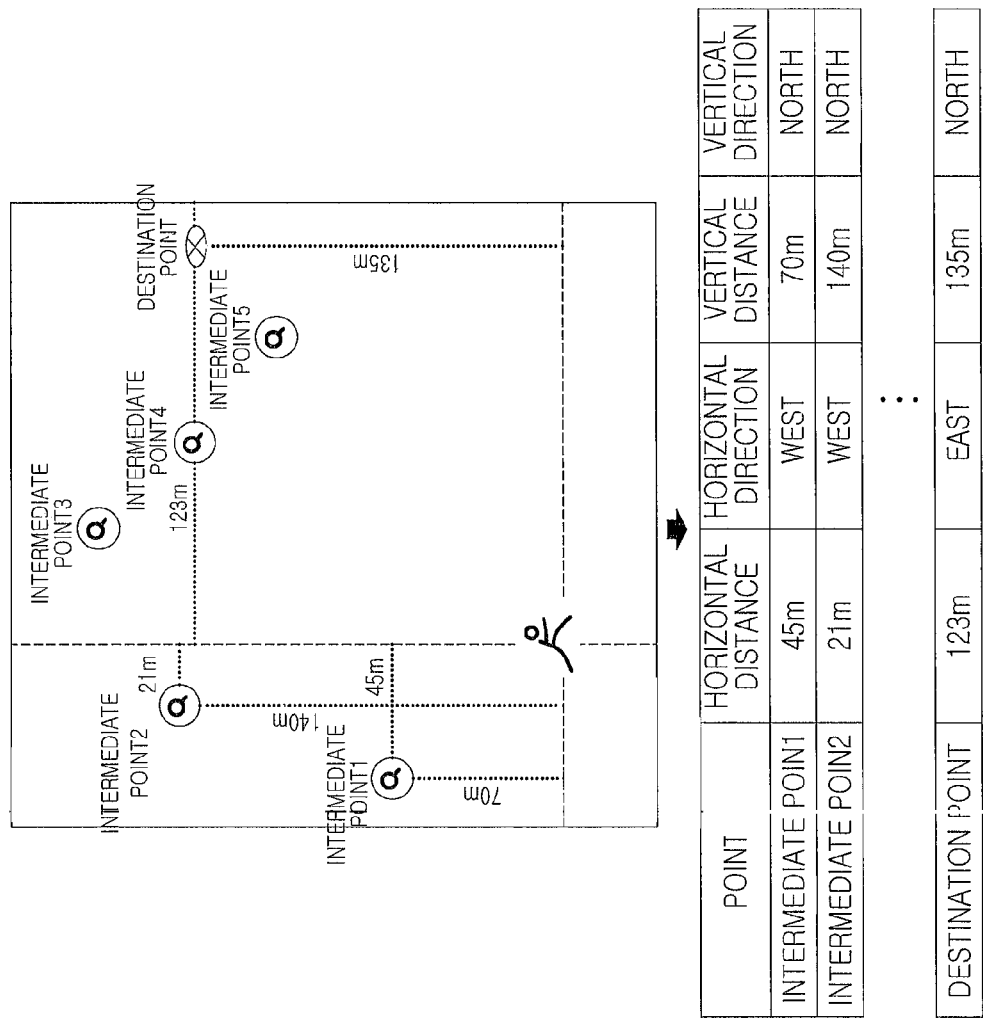
FIG. 5B illustrates a process for analyzing a route by using location information collected in a portable terminal according to an embodiment of the present invention.
Figure 5C:
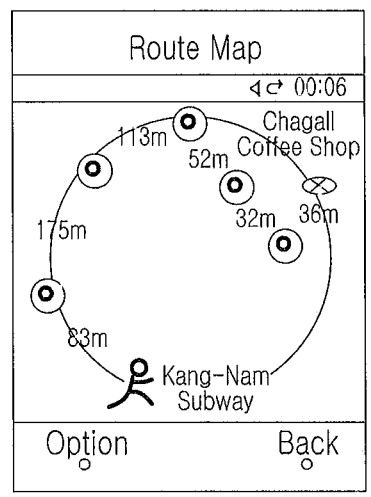
FIG. 5C illustrates a display screen that displays generating a sketch map message by using location information collected in a portable terminal according to an embodiment of the present invention.

FIGS. 5A through 5C illustrate a process for generating a sketch map message in a portable terminal according to an embodiment of the present invention.

FIG. 5A illustrates a display screen that displays setting sketch map information to be generated in a portable terminal according to an embodiment of the present invention.

As shown in FIG. 5A, the portable terminal generates a sketch map message in conjunction with a schedule function.

Accordingly, a user of the portable terminal enters information about appointments and places through a scheduler. The portable terminal adds a POI field 501 in an input field of the conventional scheduler to receive information about an appointed place from the user. Also, the portable terminal stores the POI in a database format, but reduces the amount of data stored by storing information about specific places (e.g., subway stations, bus stations, and railroad stations) instead of location information provided by a general navigation system. If there is no place among the specific places to be set by the user of the portable terminal, the user selects and inputs the specific place adjacent to the appointed place.

FIG. 5B illustrates a process for analyzing a route by using location information collected in a portable terminal according to an embodiment of the present invention.

As shown in FIG. 5B, the portable terminal periodically detects the location of a user by using location information.

In order to reduce the amount of location information stored, the portable terminal stores information about the location of a predetermined moving distance or more when storing information about the detected location of the user.

That is, if there is more than a predetermined difference in distance between the previous location and the current location of the user, the portable terminal determines that the user has moved and stores information about the movement. Alternatively, if there is less than a predetermined difference in distance between the previous location and the current location of the user, the portable terminal determines that the user is located at the same location, and does not store information about the corresponding location.

If the user is located at the same location a predetermined number of times or duration, the portable terminal determines that the user has reached the destination.

If the user has moved through an intermediate point to the destination point, the portable terminal stores location information.

FIG. 5C illustrates a display screen that displays generating a sketch map message by using location information collected in a portable terminal according to an embodiment of the present invention.

As shown in FIG. 5C, on the basis of POI information, the portable terminal displays user location information collected as illustrated in FIG. 5B, that is, information about route points of the user of the portable terminal.

In order to transmit the displayed screen to another user, the portable terminal generates a sketch map message in the format of a short message or a multimedia message.

The portable terminal generating the sketch map message may use the sketch map message as information about a section of its movement, and a portable terminal receiving the sketch map message may use the sketch map message as information about a section of movement to the destination.

The complexity of the sketch map may increase if the portable terminal displays all of the information collected in FIG. 5B. Therefore, the user may select/display a specific location, or the portable terminal may select/display only location information with a large distance between location information.

FIGS. 6A through 6F illustrate a process for using a sketch map message in a portable terminal according to an embodiment of the present invention.

Figure 6A:
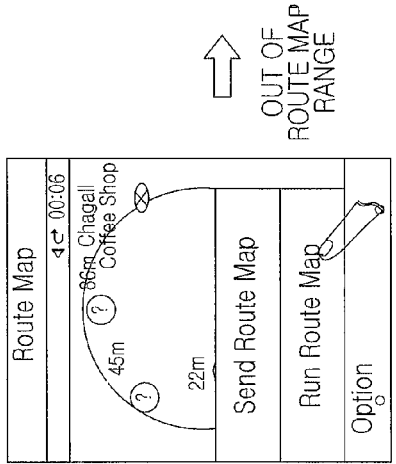
FIG. 6A illustrates a display screen that displays receiving a sketch map message from another portable terminal and executing the same in a portable terminal according to an embodiment of the present invention.

FIG. 6A illustrates a display screen that displays receiving a sketch map message from another portable terminal and executing the same in a portable terminal according to an embodiment of the present invention.

As shown in FIG. 6A, the portable terminal receives a sketch map message from another portable terminal and moves to a destination point by using the received sketch map message.

As illustrated in the drawings, if the received sketch map message is executed in the portable terminal, the portable terminal determines whether it is located in a region corresponding to the sketch map.

Figure 6B:
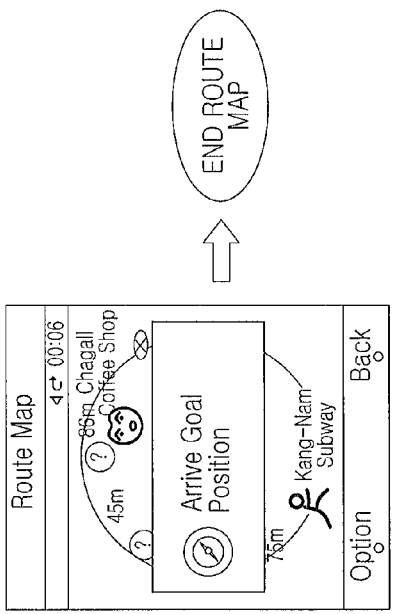
FIG. 6B illustrates a display screen displaying the state of not being located in a region corresponding to a sketch map in a portable terminal according to an embodiment of the present invention.

FIG. 6B illustrates a display screen displaying the state of not being located in a region corresponding to a sketch map in a portable terminal according to another embodiment of the present invention.

As shown in FIG. 6B, if it is not located in a region corresponding to the received sketch map, the portable terminal displays a warning notice (which notifies that it is not located in a region corresponding to the sketch map (i.e., a region adjacent to a POI region)) to notify a route deviation to the user (a schedule notification in the conjunction with a schedule function).

Figure 6C:
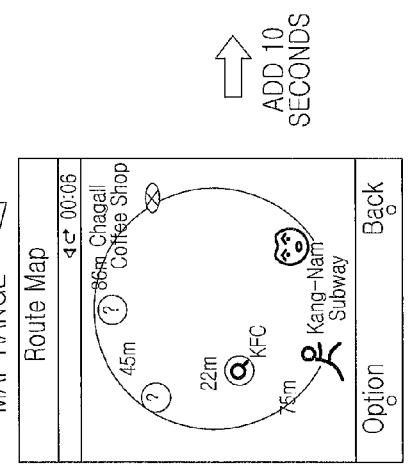
FIG. 6C illustrates a display screen displaying the state of being located in a region corresponding to a sketch map in a portable terminal according to an embodiment of the present invention.

FIG. 6C illustrates a display screen displaying the state of being located in a region corresponding to a sketch map in a portable terminal according to an embodiment of the present invention.

As shown in FIG. 6C, if it is located in a region corresponding to the received sketch map, the portable terminal displays route points corresponding to a sketch map region.

Herein, the portable terminal also displays its own location to display a moving route according to the sketch map.

Figure 6D:
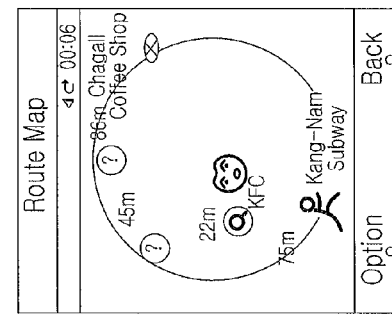
FIG. 6D illustrates a display screen displaying the state of changing the location in a region corresponding to a sketch map in a portable terminal according to an embodiment of the present invention.

FIG. 6D illustrates a display screen displaying the state of changing the location in a region corresponding to a sketch map in a portable terminal according to an embodiment of the present invention.

As shown in FIG. 6D, the portable terminal detects its own location at regular intervals (e.g., 10 seconds). This is to detect the movement of the portable terminal. When detecting its movement, the portable terminal changes its own location displayed according to the movement.

Figure 6E:
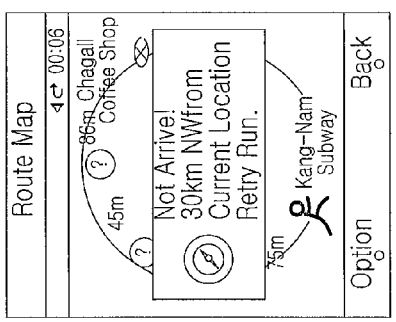
FIG. 6E illustrates a display screen displaying the state of moving to a destination by using a sketch map in a portable terminal according to an embodiment of the present invention.

FIG. 6E illustrates a display screen displaying the state of moving to a destination by using a sketch map in a portable terminal according to an embodiment of the present invention.

As shown in FIG. 6E, the portable terminal changes its location according to the sketch map as illustrated in FIG. 6D.

If it moves to the destination and does not detect any more movement, the portable terminal displays a message notifying the arrival at the destination.

Figure 6F:
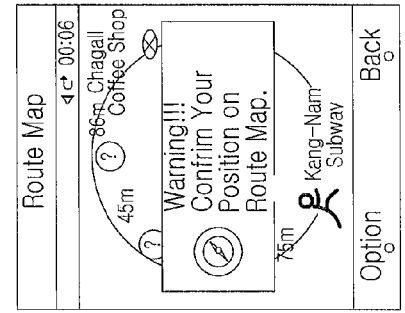
FIG. 6F illustrates a display screen displaying the state of deviating from a route while moving to a destination by using a sketch map in a portable terminal according to an embodiment of the present invention.

FIG. 6F illustrates a display screen displaying the state of deviating from a route while moving to a destination by using a sketch map in a portable terminal according to an embodiment of the present invention.

As shown in FIG. 6F, the portable terminal changes its location according to the sketch map as illustrated in FIG. 6D.

If it moves to the destination and does not detect any more movement, the portable terminal displays a message notifying the arrival at the destination as illustrated in FIG. 6E.

Alternatively, if the portable terminal does not move through the route displayed according to the sketch map and deviates from the route, the portable terminal displays a message notifying that it does not move through the route according to the sketch map.

As described above, the present invention detects the route of a user of a portable terminal and generates a sketch map message including route information in order to share information about the route with a user of another portable terminal, thereby enabling a user of a portable terminal without a navigation function to detect the route to a destination point.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An electronic device comprising:
   a communication unit configured to establish a connection with another device; and
   a controller configured to:
   transmit a location of the electronic device to the another device,
   receive a sketch map including a plurality of route points associated with the electronic device from the another device, and
   display the route points associated with the location of the electronic device among the plurality of route points included in the sketch map.

2. The device of claim 1, wherein the controller is configured to, if the location of the electronic device is changed, control to display the route points associated with the changed location of the electronic device.

3. The device of claim 1, wherein the route points is information associated with a section of movement from a current location of the electronic device to a destination.

4. The device of claim 3, wherein the controller is configured to display a moving route to the destination using the route points.

5. The device of claim 3, wherein the controller is configured to control to display the route points until located in a region corresponding to the route points associated with the destination.

6. The device of claim 1, wherein the controller is configured to control to display a moving route to a region corresponding to the displayed route points.

7. The device of claim 1, wherein the controller is configured to control to display the route points with the location of the electronic device.

8. A display method of an electronic device, comprising
   establishing a connection with another device;
   transmitting a location of the electronic device to the another device;
   receiving a sketch map including a plurality of route points associated with the electronic device from the another device; and
   displaying the route points associated with the location of the electronic device among the plurality of route points included in the sketch map.

9. The method of claim 8, further comprising:
   if the location of the electronic device is changed, displaying the route points associated with the changed location of the electronic device.

10. The method of claim 8, wherein the route points is information associated with a section of movement from a current location of the electronic device to a destination.

11. The method of claim 10, wherein the displaying the route points associated with the location of the electronic device comprises displaying a moving route to the destination using the route points.

12. The method of claim 10, wherein the route points is displayed until located in a region corresponding to the route points associated with the destination.

13. The method of claim 8, further comprising:
   displaying a moving route to a region corresponding to the displayed route points.

14. The method of claim 8, wherein the route points is displayed with the location of the electronic device.

* * * * *